(12) United States Patent
Arbel et al.

(10) Patent No.: US 12,375,844 B2
(45) Date of Patent: Jul. 29, 2025

(54) EARBUD FOR AUTHENTICATED SESSIONS IN COMPUTING DEVICES

(71) Applicant: Microsoft Technology Licensing, LLC, Redmond, WA (US)

(72) Inventors: Eran Arbel, Netanya (IL); Gilad Pundak, Rehovot (IL); Liran Lipa Lyabock, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 18/065,294

(22) Filed: Dec. 13, 2022

(65) Prior Publication Data

US 2024/0196125 A1  Jun. 13, 2024

(51) Int. Cl.
H04R 1/10 (2006.01)
G06F 21/31 (2013.01)

(52) U.S. Cl.
CPC ........... H04R 1/1041 (2013.01); G06F 21/31 (2013.01); H04R 1/1016 (2013.01)

(58) Field of Classification Search
CPC .............. H04L 63/0861; H04R 1/1016; H04R 1/1041; H04W 12/06; H04W 12/065; H04W 12/63; H04W 12/65; H04W 12/68
USPC ................................ 381/74, 314, 92; 700/94
See application file for complete search history.

(56) References Cited

U.S. PATENT DOCUMENTS

| 9,042,588 | B2* | 5/2015 | Aase ..................... H04R 1/1091 381/74 |
| 9,706,304 | B1 | 7/2017 | Kelso et al. |
| 9,883,278 | B1* | 1/2018 | Lin ....................... H04R 1/1016 |
| 9,942,222 | B1 | 4/2018 | Fenton et al. |
| 10,291,975 | B2* | 5/2019 | Howell ................ H04R 1/1041 |
| 10,757,500 | B2 | 8/2020 | Kemmerer et al. |
| 11,172,282 | B2* | 11/2021 | Hsu .......................... G06F 3/165 |
| 11,601,743 | B2* | 3/2023 | Perry ................... H04R 1/1041 |
| 2009/0067661 | A1 | 3/2009 | Keady et al. |

(Continued)

FOREIGN PATENT DOCUMENTS

CN 108810860 A 11/2018
CN 111666549 A 9/2020

(Continued)

OTHER PUBLICATIONS

"International Search Report and Written Opinion Issued in PCT Application No. PCT/US23/013390", Mailed Date: Jun. 15, 2023, 12 Pages.

(Continued)

Primary Examiner — Lun-See Lao
(74) Attorney, Agent, or Firm — Alleman Hall & Tuttle LLP

(57) ABSTRACT

A method of using an earbud to maintain a user's authenticated session comprises, after establishing a user's first authenticated session in a first computing device, broadcasting an initial ultrasonic signal from a speaker of the earbud. At least a subsequent ultrasonic echo signal that is received at an in-ear microphone of the earbud is analyzed to determine if the earbud is located in an ear of the user. The method determines that the earbud is within a predetermined distance of the second computing device. At least on condition of determining that the earbud is located in the ear of the user and that the earbud is within the predetermined distance of the second computing device, a user's second authenticated session in a second computing device is established.

20 Claims, 10 Drawing Sheets

(56) References Cited

U.S. PATENT DOCUMENTS

| | | |
|---|---|---|
| 2009/0071486 A1 | 3/2009 | Perez et al. |
| 2013/0041648 A1* | 2/2013 | Osman .................... H04S 7/302 |
| | | 381/300 |
| 2014/0269207 A1* | 9/2014 | Baym ..................... H04R 3/12 |
| | | 367/138 |
| 2015/0110333 A1* | 4/2015 | Norris ................... H04R 19/02 |
| | | 381/394 |
| 2015/0245129 A1 | 8/2015 | Dusan |
| 2016/0050204 A1 | 2/2016 | Anderson |
| 2016/0294817 A1 | 10/2016 | Tan et al. |
| 2017/0078785 A1 | 3/2017 | Qian et al. |
| 2017/0150269 A1 | 5/2017 | Li et al. |
| 2017/0215011 A1 | 7/2017 | Goldstein |
| 2017/0333755 A1 | 11/2017 | Rider |
| 2019/0230426 A1 | 7/2019 | Chun |
| 2021/0073362 A1 | 3/2021 | Alameh et al. |
| 2021/0368254 A1 | 11/2021 | Kemmerer |
| 2022/0417675 A1 | 12/2022 | Rottier |
| 2023/0370760 A1 | 11/2023 | Pundak |

FOREIGN PATENT DOCUMENTS

| | | |
|---|---|---|
| EP | 2415276 B1 | 8/2015 |
| EP | 2742700 B1 | 7/2018 |
| WO | 2017203484 A1 | 11/2017 |
| WO | 2021123758 A2 | 6/2021 |
| WO | 2022020034 A1 | 1/2022 |

OTHER PUBLICATIONS

Notice of Allowance mailed on May 14, 2024, in U.S. Appl. No. 17/745,214, 8 pages.

Mlynski, R., "Headphone Audio in Training Systems or Systems That Convey Important Sound Information", International Journal of Environmental Research and Public Health, vol. 19, Issue 5, Feb. 23, 2022, 13 Pages.

Takayuki, A., "Ear Acoustic Authentication Technology: Using Sound to Identify the Distinctive Shape of the Ear Canal", Journal of NEC Technical-Special Issue Social Value Creation Using Biometrics, vol. 13, Issue 2, Apr. 2019, 7 Pages.

International Search Report and Written Opinion received for PCT Application No. PCT/US2023/035653, mailed on Dec. 22, 2023, 15 pages.

Non-Final Office Action mailed on Jan. 25, 2024, in U.S. Appl. No. 17/745,214, 6 pages.

Notice of Allowance mailed on Aug. 13, 2024, in U.S. Appl. No. 17/745,214, 08 pages.

* cited by examiner

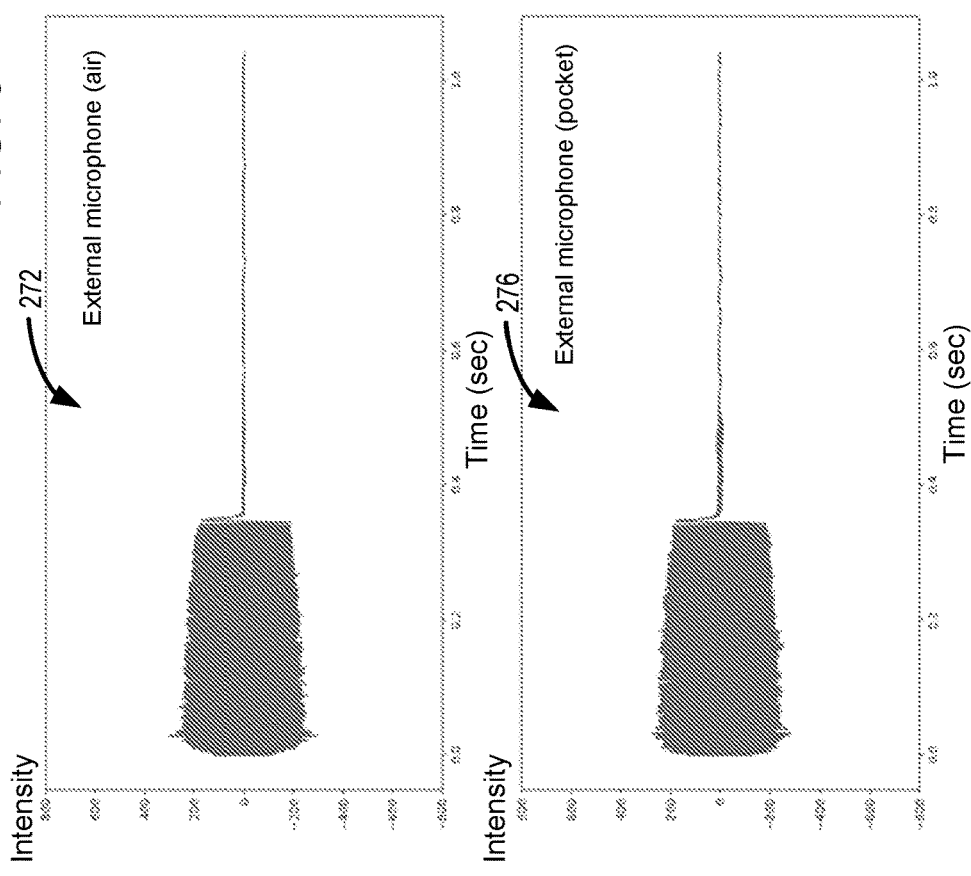
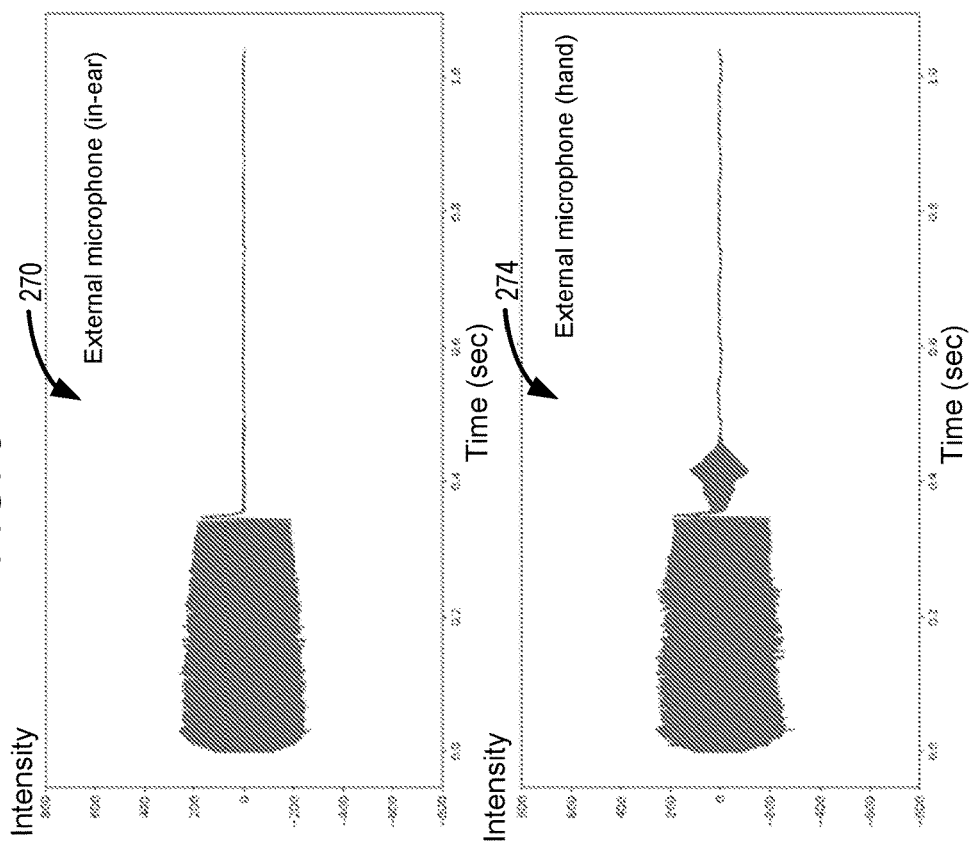

EARBUD FOR AUTHENTICATED SESSIONS IN COMPUTING DEVICES

BACKGROUND

Many people own a variety of computing devices, such as smartphones and tablet computers, that require authentication. When these devices are not used for a period of time, they can transition to a locked state and require reauthentication. Requiring users to reauthenticate devices multiple times can impact productivity and user experiences.

SUMMARY

As described in more detail below, the present disclosure relates to earbuds and methods of using an earbud to establish authenticated sessions in multiple computing devices of a user. In some examples, where a user has already established a first user's authenticated session in a first computing device, a method of using an earbud to establish a user's second authenticated session in a second computing device comprises broadcasting an initial ultrasonic signal from a speaker of the earbud. The method includes analyzing at least a subsequent ultrasonic echo signal that is received at an in-ear microphone of the earbud to determine if the earbud is located in an ear of the user. The method also determines that the earbud is within a predetermined distance of the second computing device. At least on condition of determining that the earbud is located in the ear of the user and that the earbud is within the predetermined distance of the second computing device, the method establishes a user's second authenticated session in the second computing device.

In some examples, an earbud comprises a speaker, an in-ear microphone, a processor, and a memory storing instructions executable by the processor to broadcast an initial ultrasonic signal from the speaker after establishing a user's first authenticated session in a first computing device. At least a subsequent ultrasonic echo signal received at the in-ear microphone is analyzed to determine if the earbud is located in an ear of a user. The earbud also determines if it is within a predetermined distance of a second computing device. At least on condition of determining that the earbud is located in the ear of the user and that the earbud is within the predetermined distance of the second computing device, a user's second authenticated session in a computing device is maintained.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 an example of an in-ear ultrasonic signal received in an external microphone when the earbud is located in the ear of a user.

FIG. 9 shows an example of an air ultrasonic signal received in the external microphone when the earbud is placed on a flat surface and exposed to the surrounding air.

FIG. 10 shows an example of a hand ultrasonic signal received in the external microphone when the earbud held inside the closed first of a user.

FIG. 11 shows an example of a pocket ultrasonic signal received in the external microphone when the earbud is located in a pocket of clothing.

DETAILED DESCRIPTION

As noted above, many people own and use a variety of computing devices, such as smartphones, tablet computers, head-mounted displays, etc., that require authentication. When these devices are not used for a period of time, they can transition to a locked state that requires the user to again reauthenticate the device. Such frequent requirements for reauthentication can impact a user's productivity and experiences with these devices.

Accordingly, and as described in more detail below, configurations of the present disclosure provide earbuds and methods of using an earbud to establish authenticated sessions in multiple computing devices of a user. As described in more detail below, the earbuds and methods described herein advantageously automatically authenticate users to their nearby devices, thereby eliminating the need to manually interact with the devices to reestablish an authenticated session.

Figure 1:
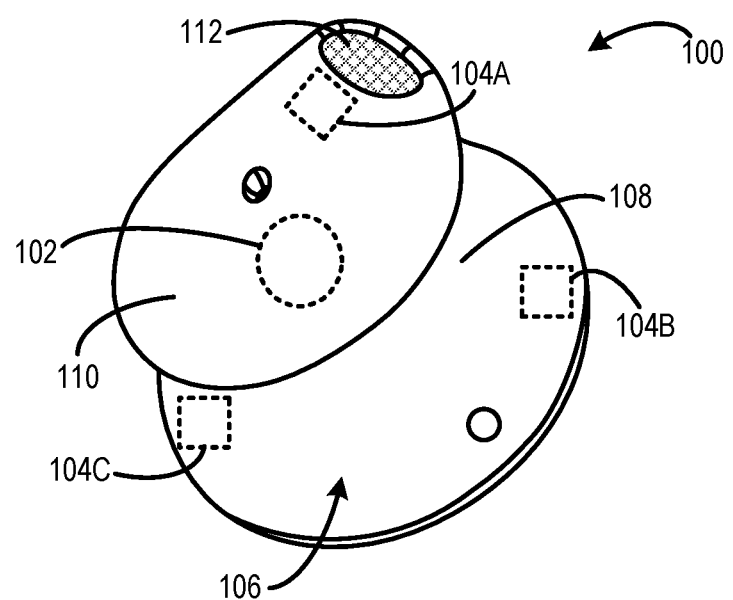
FIG. 1 shows an example of an earbud according to aspects of the present disclosure.

FIG. 1 shows one non-limiting example of an earbud 100 that is configured as a wireless audio device to be worn in a user's left ear. In this example, the earbud 100 includes an earbud speaker 102 configured to emit sound into the user's left ear. The earbud 100 includes a microphone array configured to capture sound emitted from the user's mouth and the surrounding environment, as well as sound arriving at and inside the user's ear. In this example, the microphone array includes a plurality of microphones 104A, 104B, 104C described in more detail below.

As described further below, after establishing a first authenticated session in a first computing device, the earbud 100 is configured to establish one or more additional authenticated sessions with one or more other computing devices by determining that the earbud is located in the ear of the user and that the earbud is within a predetermined distance of another computing device.

The earbud 100 includes a housing 106. The housing 106 may be formed from any suitable materials including, but not limited to, plastic, metal, ceramic, glass, crystalline materials, composite materials, or other suitable materials. As shown in FIG. 1, the housing 106 includes a neck 108 and a bud 110. The neck 108 is sized and shaped to position the bud 110 against the concha, a hollow depression in the user's ear, when the earbud 100 is placed in the user's ear. The bud 110 includes a speaker port 112. The bud 110 is sized and shaped to align the speaker port 112 to direct sound emitted from the earbud speaker 102 into the user's ear canal when the earbud 100 is in the user's ear.

In the illustrated implementation, the microphone array 104 includes an in-ear (feedback) microphone 104A, a first external (feed forward) microphone 104B, and a second external (feed forward) microphone 104C. The in-ear microphone 104A is positioned proximate to the speaker port 112 in the bud 110. The first external microphone 104B and the second external microphone 104C are positioned at the base of the neck 108.

The in-ear microphone 104A is configured to capture primarily sound in the user's ear. More particularly and as described in more detail below, in the present examples the in-ear microphone is configured to detect an ultrasonic echo signal in the user's ear that is generated by an acoustical test signal (e.g., inaudible chirp) emitted by the earbud speaker 102 reflecting off the unique architecture of the user's ear canal. The earbud analyzes these echo signals to determine if the earbud is located in the ear of the user. In some examples the in-ear microphone 104A is also used for active noise cancellation and/or other features.

The first external microphone 104B is positioned closer to the user's mouth when the earbud 100 is in the user's ear. The first external microphone 104B is configured to capture primarily sound emitted from the user's mouth. The second external microphone 104C is positioned further from the user's mouth when the earbud 100 is in the user's ear. The second external microphone 104C is configured to capture primarily background noise outside of the earbud 100. Additionally and as described in more detail below, in some examples the first external microphone 104B and second external microphone 104C are configured to capture the acoustical test signals emitted by the earbud speaker 102 and echoes of such signals to assist in determining whether the earbud is located in the user's ear.

In different examples, the earbud 100 may include only an in-ear microphone, or an in-ear microphone and any suitable number of external microphones, including one, two, three, or more external microphones. Moreover, the plurality of microphones may be positioned at any suitable position and/or orientation within the earbud 100.

A corresponding right-side earbud (not shown) may be worn in the user's right ear to allow for the user to listen to audio in the user's right ear. The right-side earbud may be configured to provide the same functionality as the earbud 100 described herein. The right-side earbud and the left-side earbud 100 may be worn together to provide stereo (and/or spatially enhanced) audio playback.

The earbud 100 is provided as a non-limiting example. The earbud 100 may take any suitable shape and have additional or fewer components as those illustrated and described herein. The concepts described herein are broadly applicable to differently sized and shaped earbuds.

Figure 2:
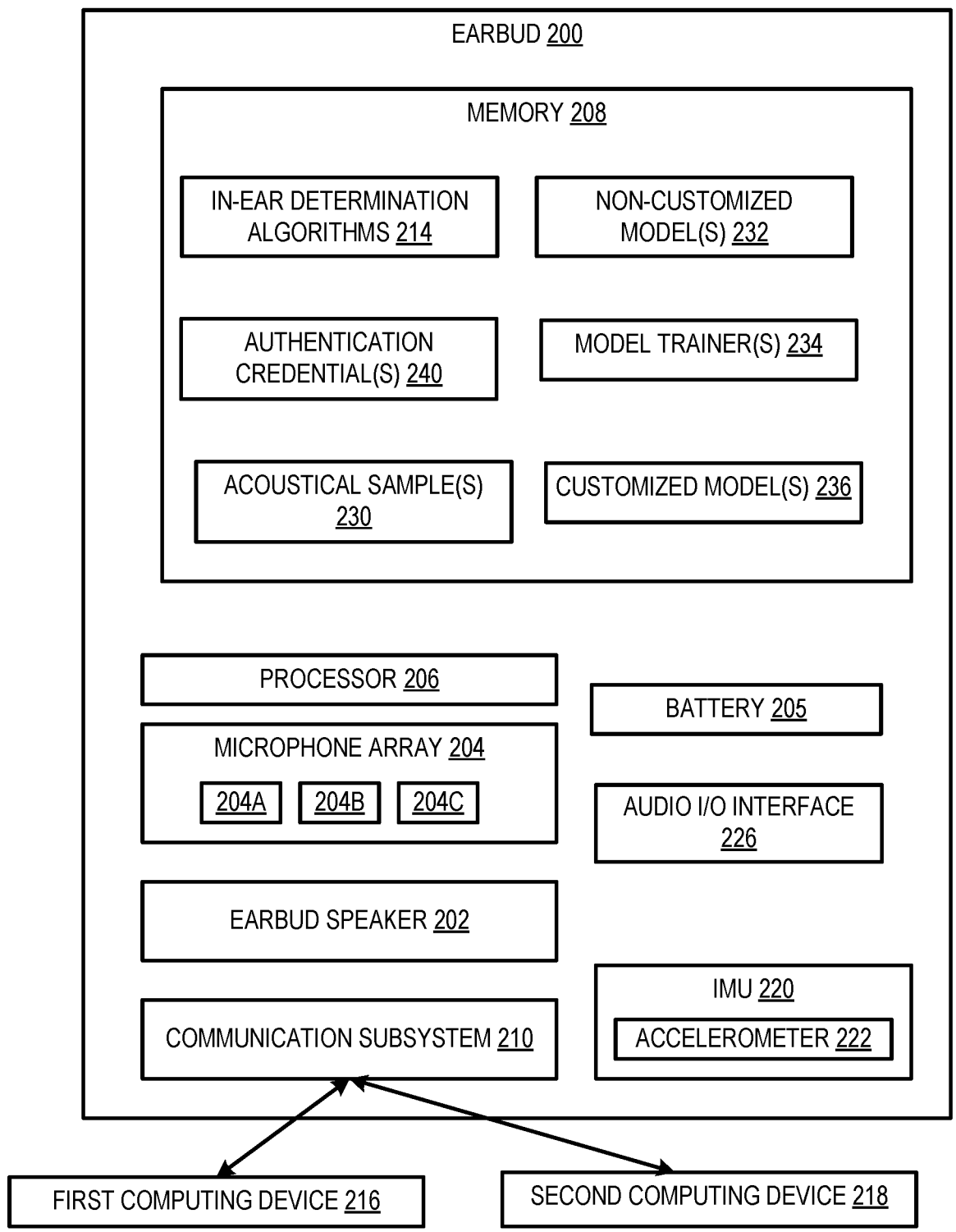
FIG. 2 shows an example block diagram of an earbud and two computing devices.

FIG. 2 shows an example block diagram of an earbud 200 configured to determine if the earbud is located in an ear of a user, and to use such determinations to establish authenticated session(s) with multiple user computing devices. In one example, the earbud 200 corresponds to the earbud 100 shown in FIG. 1. In other examples, the earbud 200 may correspond to other forms of earbuds.

The earbud 200 includes an earbud speaker 202, a microphone array 204, a battery 205, and a communication subsystem 210. The earbud 200 also includes a processor 206 and a memory 208 storing instructions executable by the processor to establish authenticated sessions in various computing devices of the user. More particularly, and as described in more detail below, after establishing a user's first authenticated session in a first computing device, in-ear determination algorithms 214 are executed to cause the earbud speaker 202 to broadcast ultrasonic signals (inaudible chirps) into the user's ear canal, and to analyze at least a subsequent ultrasonic echo signal that is received at the in-ear microphone to determine if the earbud 200 is located in an ear of a user. When the earbud 200 determines that it is within a predetermined distance of a second computing device, at least on condition of determining that the earbud 200 is in the ear of the user and that the earbud is within the predetermined distance of the second computing device, a user's second authenticated session in the second computing device is established.

The earbud speaker 202 is configured to emit sound into a user's ear. In one example, the earbud speaker 202 corresponds to the earbud speaker 102 of the earbud 100 shown in FIG. 1. The microphone array 204 is configured to capture sound generated by the earbud speaker 202 as well as sound emitted from the user's mouth and the surrounding environment. The microphone array 204 includes a plurality of microphones 204A, 204B, 204C. In one example, the plurality of microphones 204A, 204B, 204C correspond to the plurality of microphones 104A, 104B, 104C of the earbud 100 shown in FIG. 1. As noted above, the microphone array 204 may include any suitable number of microphones.

As described in more detail below, in some examples the in-ear determination algorithms 214 include generator algorithms that are executed by the processor 206 to generate ultrasonic signals that are provided for output by the earbud speaker 202 via an audio IO interface 226. In different examples, such ultrasonic signals are broadcast alone and/or in combination with an audio data stream from a companion computing device.

The communication subsystem 210 is configured to communicatively couple the earbud 200 with one or more companion computing devices, such as first computing device 216 and second computing device 218. In some instances, the communication subsystem 210 is configured to communicatively couple the earbud 200 with a companion computing device via a wireless connection, such as via Bluetooth or Wifi signals.

The first computing device 216 and second computing device 218 may include any suitable type of device including, but not limited to, a smartphone, a tablet computer, a laptop computer, a desktop computer, an augmented reality device, a wearable computing device, a gaming console, an audio source device, a communication device, or another type of computing device. In some instances, the first computing device 216 and/or second computing device 218 may send audio signals to the earbud 200 for playback via the earbud speaker 202.

In this example the earbud 200 includes an inertial measurement unit (IMU) 220. The IMU 220 is configured to determine acceleration and/or orientation of the earbud 100. The IMU 220 includes at least one accelerometer 222 configured to measure acceleration.

The earbud 200 also includes an audio IO interface 226 that provides audio coding and decoding for audio signals received from the processor 206 and microphones 204A, 204B, 204C. For example, the audio IO interface 226 may encode a signal or a data stream, such as an echo signal generated by in-ear microphone 204A in response to receiving an echo signal in the user's ear, for storage or transmission. The audio IO interface 226 also may decode a signal or a data stream, such as an ultrasonic signal generated by a signal generator.

With reference now to FIGS. 3A-3D, an example method 300 for using an earbud to establish multiple user's authenticated sessions in multiple computing devices of a user will now be described. FIGS. 3A-3D depict a flowchart illustrating the method 300. The following description of method 300 is provided with reference to the software and hardware components described herein and shown in FIGS. 1, 2, and 15. For example, the method 300 may be performed by the earbud 100 or earbud 200, hardware, software, and/or firmware of the earbud 100 or earbud 200. For ease of description, the following examples are described with respect to the earbud 200.

It will be appreciated that the following description of method 300 is provided by way of example and is not meant to be limiting. Therefore, it is to be understood that method 300 may include additional and/or alternative steps relative to those illustrated in FIGS. 3A-3D. Further, it is to be understood that the steps of method 300 may be performed in any suitable order. Further still, it is to be understood that one or more steps may be omitted from method 300 without departing from the scope of this disclosure. It will also be appreciated that method 300 also may be performed in a variety of other earbuds having different form factors, components, and/or capabilities, and in other contexts using other suitable components.

In some examples, the method 300 is performed after the user has established an authenticated session with a companion computing device, such as first computing device 216, with the authenticated session authorizing the user to use the companion computing device. For example, the user may have established an authenticated session with her mobile phone via facial recognition, entering a password, or any other suitable technique. In some examples, and as described further below, aspects of the method 300 are performed to establish an authenticated session with a computing device.

Figure 3A:
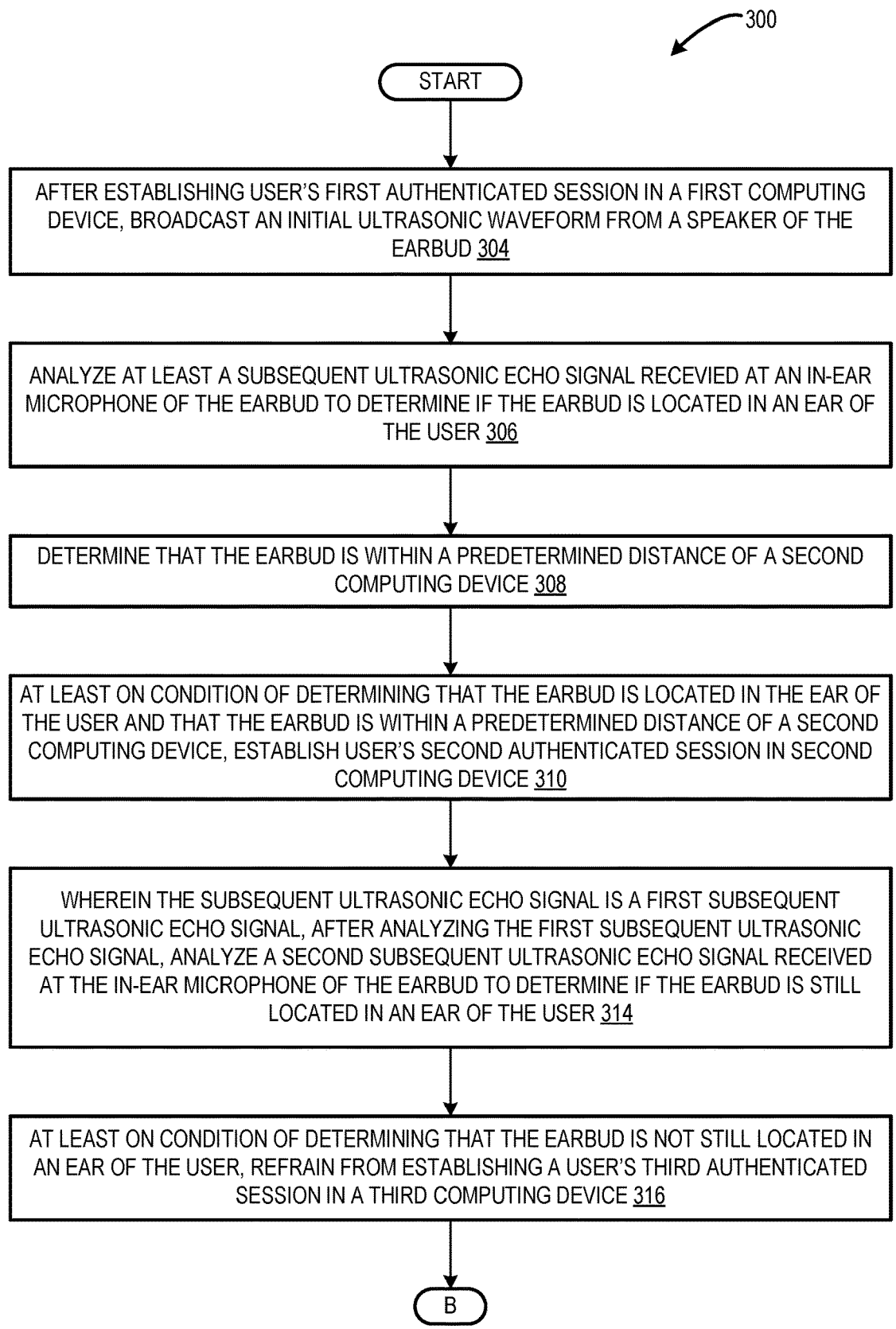
FIGS. 3A-3D show a block diagram of an example method of using an earbud to maintain a user's authenticated session in a computing device according to examples of the present disclosure.
Figure 3B:
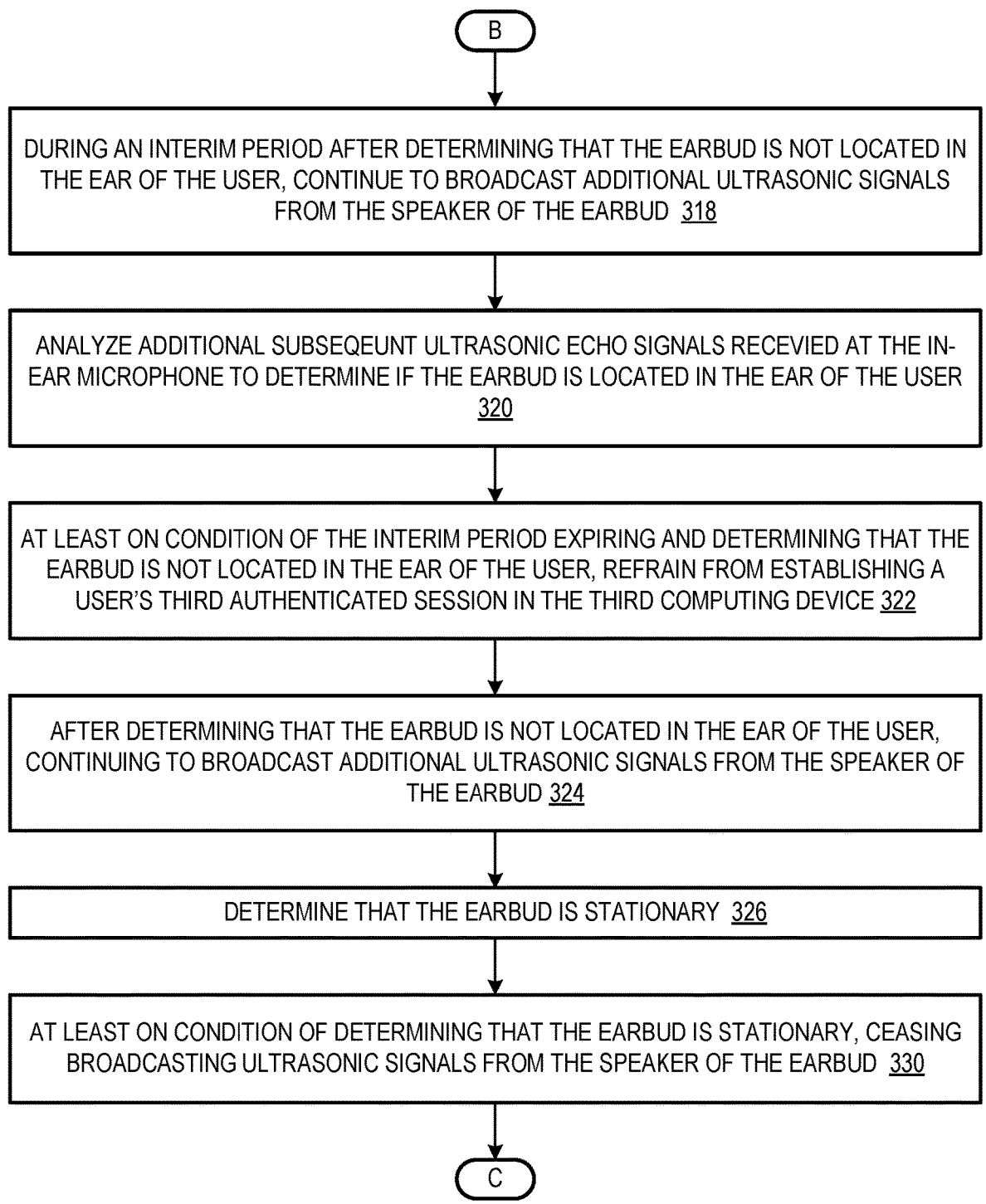

With reference to FIG. 3A, at 304 the method 300 includes, after establishing a user's first authenticated session in a first computing device, broadcasting an initial ultrasonic signal from a speaker of the earbud. For example, the speaker 202 of the earbud 200 can broadcast an initial ultrasonic signal. The initial ultrasonic signal has a frequency that is outside of the human hearing range. In some examples, the signal has a frequency in the low ultrasonic range, such as between approximately 21 kHz-25 kHz.

At 306 and as described in more detail below, the method 300 includes analyzing at least a subsequent ultrasonic echo signal received at an in-ear microphone of the earbud to determine if the earbud is located in an ear of the user. At 308 the method 300 includes determining that the earbud is within a predetermined distance of a second computing device. In different examples, the predetermined distance can be 0.5 meters, 1 meter, 2 meters, or other suitable distance. The earbud 200 can use any suitable technique for determining that it is within the predetermined distance another computing device. For example, the earbud 200 and other computing device can share tokens identifying their position.

At 310 the method 300 includes, at least on condition of determining that the earbud is located in the ear of the user and that the earbud is within the predetermined distance of the second computing device, establishing the user's second authenticated session in the second computing device. In some examples and as described in more detail below, the earbud repeatedly broadcasts ultrasonic signals and analyzes subsequent ultrasonic echo signals to determine whether the earbud is still located in the user's ear. The frequency of such broadcasting and determination can be any suitable frequency, such as 0.5 Hz, 1 Hz, 2 Hz, or other frequency.

In this manner, and in one potential advantage of the present disclosure, where a user wearing an earbud 200 has established an authenticated session with a first computing device, when the user moves to within a predetermined distance of another of the user's computing device(s), the in-ear determination algorithms 214 can automatically establish another user's authenticated session with the other computing device. For example, upon verifying that the other computing device is associated with the user, the in-ear determination algorithms 214 can deliver an authentication credential 240 to the other computing device via the communication subsystem 210. Advantageously, by simply keeping the earbud in the user's ear, this allows the user to perform a variety of tasks and easily interact with her other computing devices without requiring the user to repeatedly create authenticated sessions in each additional device.

In some examples, the method 300 determines if the earbud is located in an ear of the user by analyzing a subsequent ultrasonic echo signal received at the in-ear microphone of the earbud after an initial ultrasonic signal is broadcast by the speaker of the earbud. For example, in a training phase acoustical samples 230 of subsequent ultrasonic echo signals received within an ear of the user can be collected via in-ear microphone 204A and stored in memory 208 of the earbud 200. A classifier is then generated using the acoustical samples 230 to produce an acoustical signature of the user's ear canal.

In some examples, the earbud 200 includes a non-customized machine learning model 232 that is trained on non-user-specific in-ear echo signals and out-of-ear signals collected from different users with differently-shaped ear canals using a model trainer 234. The out-of-ear echo signals can be collected from a variety of out-of-ear surfaces and environments, such as when the earbud is held in a closed hand, located in a pocket of clothing, and resting on a surface (e.g., in air). When the earbud 200 is determined to be located in a particular user's ear by a non-customized model 232, user-specific in-ear samples are collected. The model trainer 234 utilizes features extracted from the user-specific in-ear samples to train the non-customized machine learning model 232 and create a user-customized machine learning model 236. In some examples, the model trainer(s) 234 train the non-customized machine learning model 232 by performing supervised machine learning using labeled acoustical samples 230 that indicate the location of the earbud 200.

Figure 4:
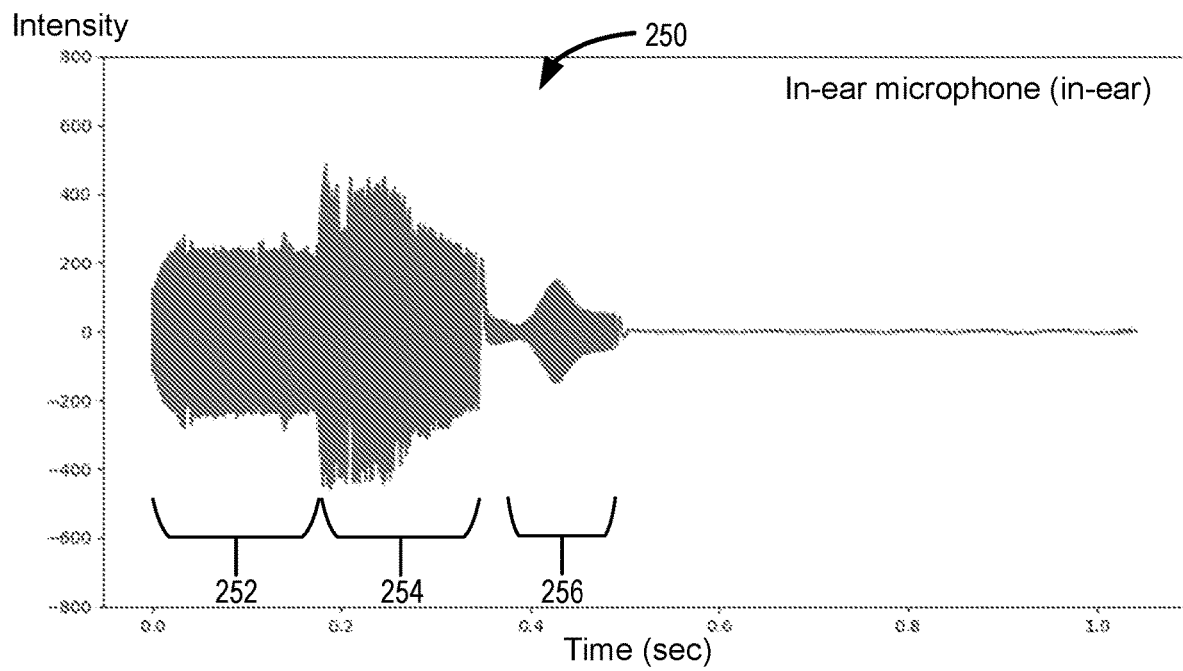
FIG. 4 shows an example of an in-ear ultrasonic signal received in an in-ear microphone.

With reference now to FIG. 4, an example of an in-ear ultrasonic signal 250, corresponding to an initial ultrasonic signal broadcast by the earbud speaker 202, is illustrated. It will be appreciated that this signal and the signals of FIGS. 5-11 below are merely examples used for descriptive purposes only, and that a wide variety of different signals and corresponding frequencies, sampling rates, and other signal properties can be utilized to practice the present disclosure. The signal 250 is received at the in-ear microphone 204A of the earbud 200. In this example the earbud 200 is located in the ear of a user. The x-axis represents time in seconds and the y-axis represents normalized signal intensity, such as decibels or voltage. A first portion 252 of the signal corresponds to a portion of the initial ultrasonic signal broadcast by the earbud speaker 202 that travels in a direct path between the speaker 202 and the in-ear microphone 204A. A second portion 254 of the signal 250 represents a mixture of (1) a direct signal received via a direct path between the speaker and the in-ear microphone 204A and (2) a subsequent ultrasonic echo signal received via reflection from the user's ear canal. A third portion 256 of the signal 250 represents another subsequent ultrasonic echo signal received via reflection from the user's ear canal. It will be appreciated that the signal 250 corresponds to a unique acoustical in-ear signature that represents a specific geometry of this user's ear canal.

Figure 5:
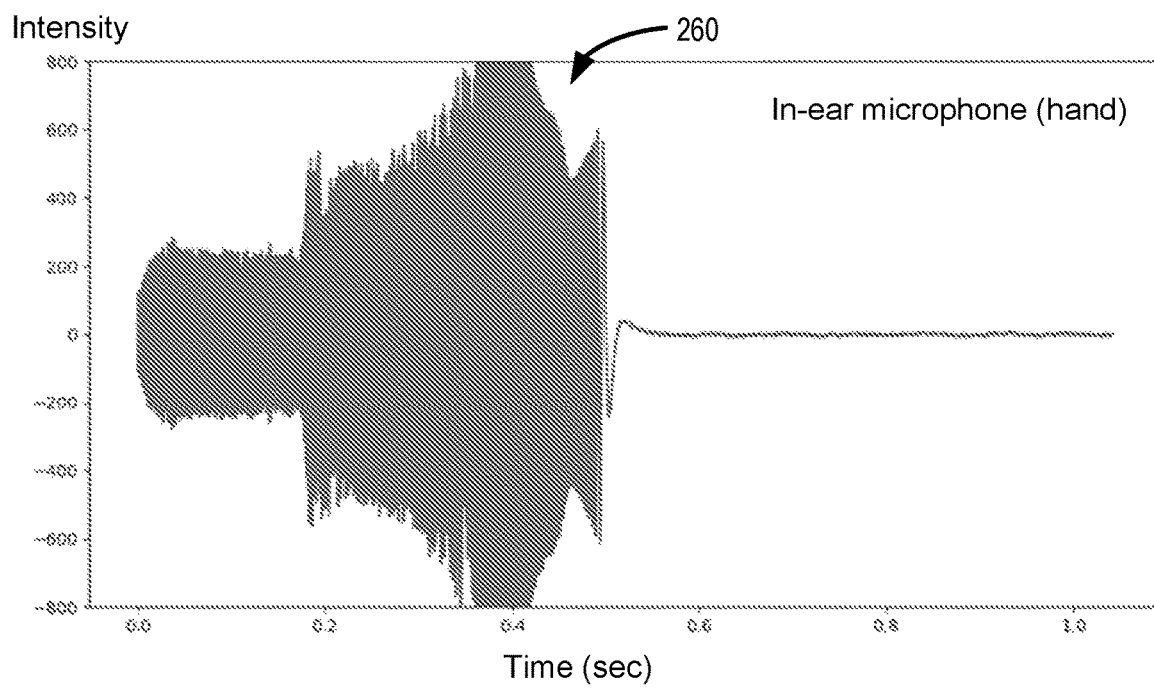
FIG. 5 shows an example of a hand ultrasonic signal received in the in-ear microphone when the earbud is held inside the closed first of a user.
Figure 6:
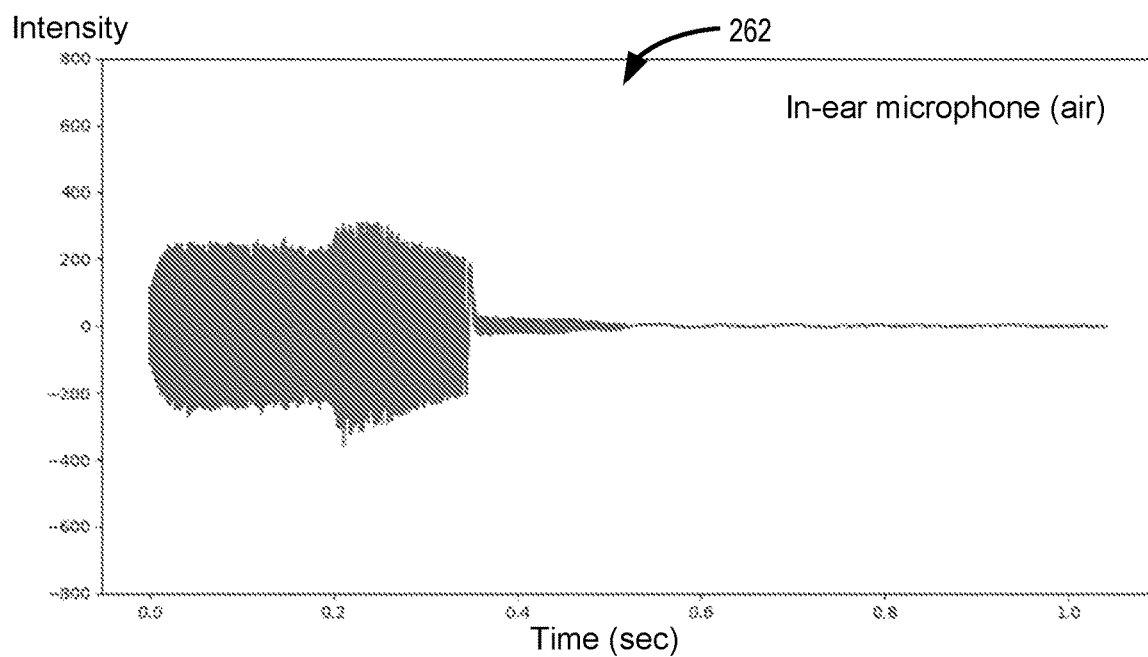
FIG. 6 shows an example of an air ultrasonic signal received in the in-ear microphone when the earbud is placed on a flat surface and exposed to the surrounding air.
Figure 7:
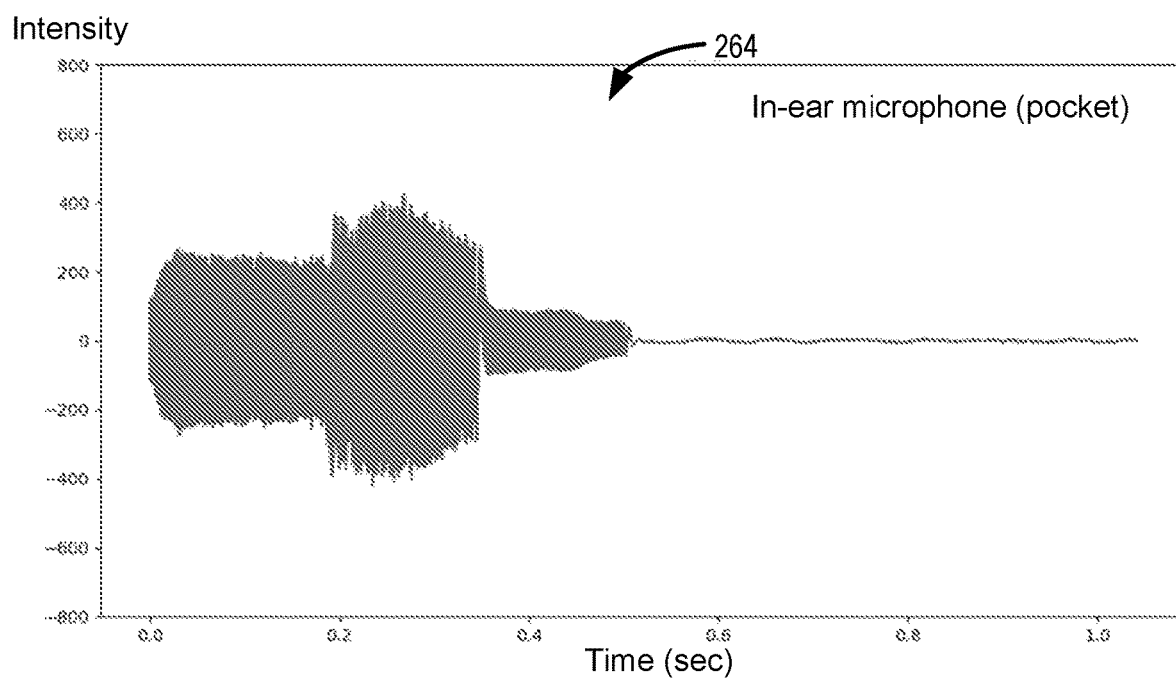
FIG. 7 shows an example of a pocket ultrasonic signal received in the in-ear microphone when the earbud is located in a pocket of clothing.

FIGS. 5-7 illustrate examples of out-of-ear ultrasonic signals received at the in-ear microphone 204A of the earbud 200 when the earbud is in locations other that the user's ear. The out-of-ear ultrasonic signals are generated by broadcasting the same initial ultrasonic signal via the earbud speaker 202 as is used to generate the in-ear ultrasonic signals 250 of FIG. 4. FIG. 5 shows an example of a hand ultrasonic signal 260 that is generated when the earbud 200 held inside the closed first of a user. FIG. 6 shows an example of an air ultrasonic signal 262 that is generated when the earbud 200 is placed on a flat surface and exposed to the surrounding air. FIG. 7 shows an example of a pocket ultrasonic signal 264 that is generated when the earbud 200 is located in a pocket of clothing, such as in the front pocket of a pair of denim jeans.

As noted above, signal samples such as the foregoing can be used to build a classifier that is trained to identify an acoustical signature of a particular user's ear canal. Accordingly, such a classifier can be used to analyze a subsequent ultrasonic echo signal received at the in-ear microphone 204A following the broadcast of an initial ultrasonic signal by the earbud speaker 202 to determine if the earbud 200 is located in an ear of a user. As noted above, at least on condition of determining that the earbud is located in the ear of the user, an authenticated session in a computing device is then maintained.

Additionally, each person has a unique ear canal geometry that includes a particular length and diameter of the ear canal, and a particular ear drum angle with respect to the canal, all of which function to create a particular echo signal that is unique to the individual. Further and as described in more detail below, the present disclosure includes techniques for quickly determining when an earbud is removed from a user's ear. Accordingly, and in another potential advantage of the present disclosure, the techniques described herein present a method of using an earbud to maintain a user's authenticated session in a computing device, via identifying a user specific ear canal signature or a non-user-specific ear canal signature, that is very difficult if not impossible to spoof or fool. By contrast, earbuds that use a proximity sensor or a capacitive sensor for "in-ear" detection can be easily fooled when extracting the earbud from a user's ear.

As noted above, once a user's authenticated session in a computing device has been established and the earbud 200 is determined to be located in the ear of the user, the earbud repeatedly broadcasts ultrasonic signals and analyzes subsequent ultrasonic echo signals to determine whether the earbud is still located in the user's ear. With reference again to FIG. 3A, at 314 the method 300 includes, where a subsequent ultrasonic echo signal is a first subsequent ultrasonic echo signal, after analyzing the first subsequent ultrasonic echo signal, analyzing a second subsequent ultrasonic echo signal received at the in-ear microphone of the earbud to determine if the earbud is still located in an ear of the user.

With reference again to FIG. 3A, at 316 the method 300 includes, at least on condition of determining that the earbud is not located in the ear of the user, refraining from establishing a user's third authenticated session in a third computing device. Advantageously, in this manner the earbud 200 promptly stops establishing authenticated sessions with other user computing devices when the user removes the earbud, thereby protecting against potential unauthorized access to the companion computing device(s).

In some use cases, a user may briefly remove and then reinsert an earbud 200. For example, a user who is exercising and listening to music through the earbud 200 may briefly remove the earbud to wipe perspiration and then reinsert the earbud. In these cases, the user desires the maintain their ability to automatically establish authenticated sessions with companion computing devices. Accordingly and in some examples, the earbud 200 can delay the cessation of establishing additional authenticated sessions in additional computing devices to accommodate these types of use cases. Accordingly and with reference again to FIG. 3B, at 318 the method 300 includes, during an interim period after determining that the earbud is not located in the ear of the user, continuing to broadcast additional ultrasonic signals from the speaker of the earbud. In different examples, the interim period is 2 seconds, 4 secs, 10 secs, or other suitable timeframe.

At 320 the method 300 includes, during the interim period analyzing additional subsequent ultrasonic echo signals received at the in-ear microphone to determine if the earbud is located in the ear of the user. At 322 the method 300 includes, at least on condition of the interim period expiring and determining that the earbud is not located in the ear of the user, refraining from establishing a user's third authenticated session in a third computing device. Advantageously, in these examples the user is provided a grace period after removing an earbud in which the earbud continues to establish additional authenticated session(s) with one or more additional companion computing devices. When the interim period expires and the user has not reinserted the earbud, the earbud refrains from establishing additional authenticated session(s) with other user computing devices.

In some examples, after an earbud 200 is removed, the earbud 200 can continue broadcasting additional ultrasonic signals from the speaker of the earbud and analyzing subsequent ultrasonic echo signals to determine if the earbud has been reinserted into an ear of the user. However, continuing to broadcast and analyze signals consumes power and reduces battery life. Accordingly and in some examples, at 324 the method 300 includes, after determining that the earbud is not located in the ear of the user, continuing to broadcast additional ultrasonic signals from the speaker of the earbud. At 326 the method 300 includes determining that the earbud is stationary, such as by analyzing signals received from the IMU 220. At 330 the method 300 includes, at least on condition of determining that the earbud is stationary, ceasing broadcasting ultrasonic signals from the speaker of the earbud. For example, after removing the earbud the user sets the earbud on a static surface such as a table, thereby indicating that the user is unlikely to quickly reinsert the earbud. Advantageously, by ceasing broadcasting ultrasonic signals after determining that the earbud is stationary, these examples conserve power resources and extend battery life of the earbud.

Figure 3C:
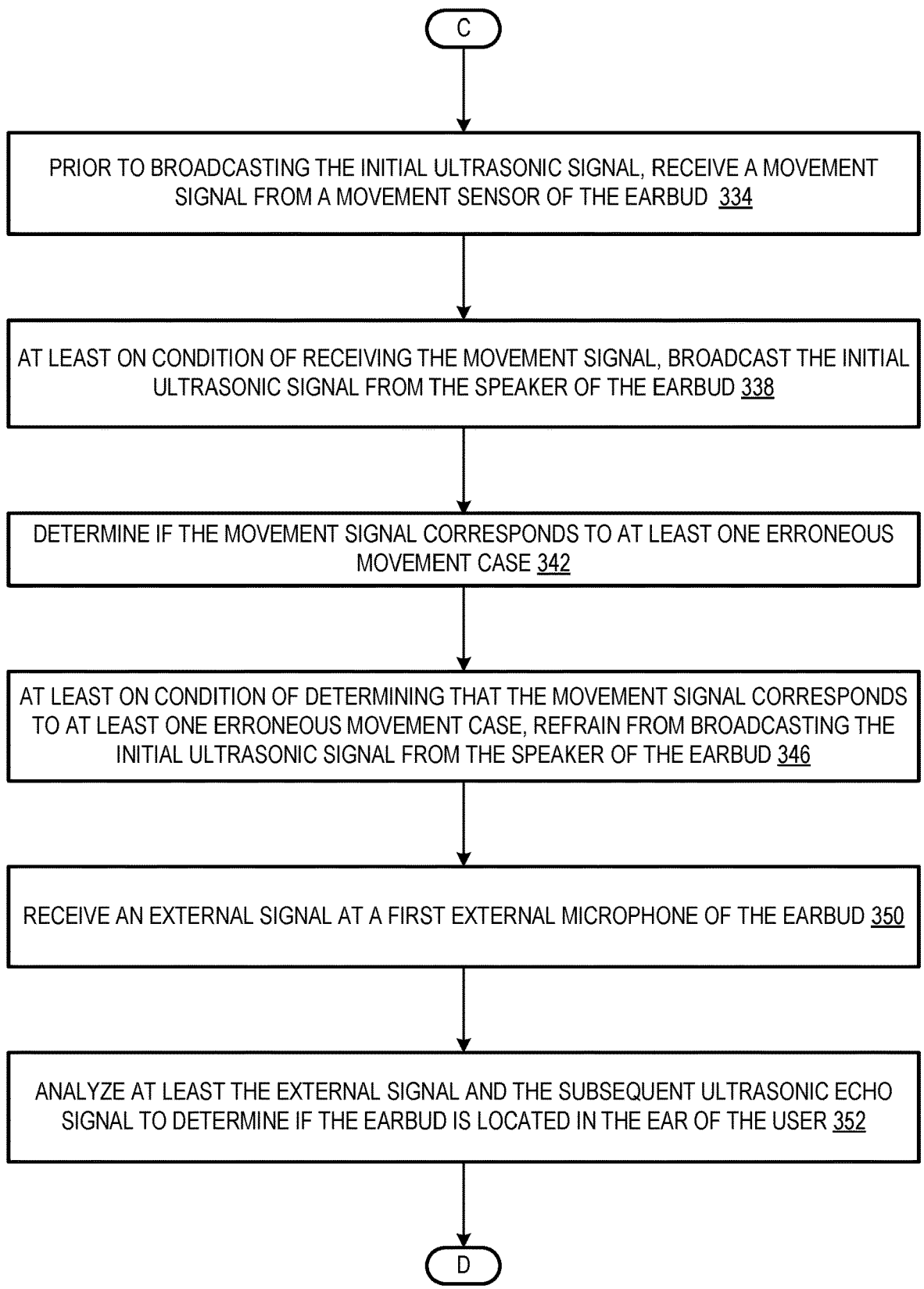

In some examples, with reference now to FIG. 3C and in another configuration that can advantageously conserve battery life, at 334 the method 300 includes, prior to broadcasting any initial ultrasonic signals, receiving a movement signal from a movement sensor of the earbud. At 338 the method 300 includes, at least on condition of receiving the movement signal, broadcasting the initial ultrasonic signal from the speaker of the earbud. Advantageously, in these examples while the earbud is stationary it refrains from broadcasting ultrasonic signals or analyzing echo signals, thereby conserving power resources. When a user picks up the earbud and the IMU 220 correspondingly senses movement, the earbud 200 can then begin broadcasting an initial ultrasonic signal and determining if the earbud is located in an ear of the user. When the earbud is determined to be located in the ear of the user, a user's authenticated session can be established in a companion computing device as described herein.

In some examples, the earbud 200 can identify one or more erroneous movement cases that are unlikely to predict that the user will insert the earbud into the user's ear. For example, the earbud 200 may be resting on a bed and the user may sit on the bed, thereby jostling the earbud on the bed surface. In another example, the earbud may be located in the user's backpack that is resting on a seat of a subway car. The backpack may periodically move as the subway car encounters bumps. Advantageously, when an erroneous movement case is identified, the earbud 200 can refrain from initiating the broadcast of initial ultrasonic signals and analysis of subsequent echo signals, thereby conserving battery life.

Accordingly, at 342 the method 300 includes determining if a movement signal from the IMU 220 corresponds to at least one erroneous movement case. For example, one or more erroneous movement signatures can be stored in memory 208, and the earbud 200 can determine whether the movement signal from the IMU 220 corresponds to an erroneous movement signature. At 346 the method 300 includes, at least on condition of determining that the movement signal corresponds to the at least one erroneous movement case, refraining from broadcasting the initial ultrasonic signal from the speaker of the earbud.

In some examples and as noted above, an earbud can include one or more external microphones. In the present example and as described above, earbud 200 includes external microphones 204B and 204C that are located outside the user's ear canal when the earbud is inserted into the user's ear. In some examples, external signals corresponding to ultrasonic signals broadcast by the earbud speaker 202 are received at one or both of the external microphones 204B, 204C and then analyzed by the in-ear determination algorithms 214 along with ultrasonic signals received by the in-ear microphone to determine if the earbud 200 is located in the user's ear.

With reference now to FIGS. 8-11, examples of external ultrasonic signal signals are illustrated. Each of the external ultrasonic signals corresponds to the same initial ultrasonic signal that is broadcast by the earbud speaker 202 and used to generate the in-ear ultrasonic signal 250 of FIG. 4. In these examples, the external ultrasonic signals are received at the first external microphone 204B. FIG. 8 shows an example of an in-ear ultrasonic signal 270 that is received at the first external microphone 204B when the earbud 200 is located in the ear of a user. FIG. 9 shows an example of an air ultrasonic signal 272 that is generated when the earbud 200 is placed on a flat surface and exposed to the surrounding air. FIG. 10 shows an example of a hand ultrasonic signal 274 that is generated when the earbud 200 held inside the closed first of a user. FIG. 11 shows an example of a pocket ultrasonic signal 276 that is generated when the earbud 200 is located in a pocket of clothing, such as in the front pocket of a pair of denim jeans.

Samples such as these examples can be used to build classifiers that are trained to identify the acoustical signature of the particular location of the earbud 200. Accordingly, such classifiers can be used to analyze an external ultrasonic signal received at the first external microphone 204B following the broadcast of an initial ultrasonic signal by the earbud speaker 202, along with analyzing ultrasonic signals received by the in-ear microphone as described above, to determine if the earbud 200 is located in the user's ear. In some examples, the classifiers for the in-ear microphone 204A and the first external microphone 204B can analyze the respective signals received by these microphones and output probabilities that the earbud 200 is or is not located in an ear of the user. These probabilities can be aggregated and compared to a threshold to determine whether the earbud is located in the ear of the user.

Accordingly and with reference again to FIG. 3C, at 350 the method 300 includes receiving an external signal at a first external microphone of the earbud. At 352 the method 300 includes analyzing at least the external signal and the subsequent ultrasonic echo signal to determine if the earbud is located in the ear of the user. Advantageously, in these examples utilizing and analyzing signals from an external microphone provides a more robust estimation of the likelihood that the earbud 200 is located in an ear of the user.

Figure 3D:
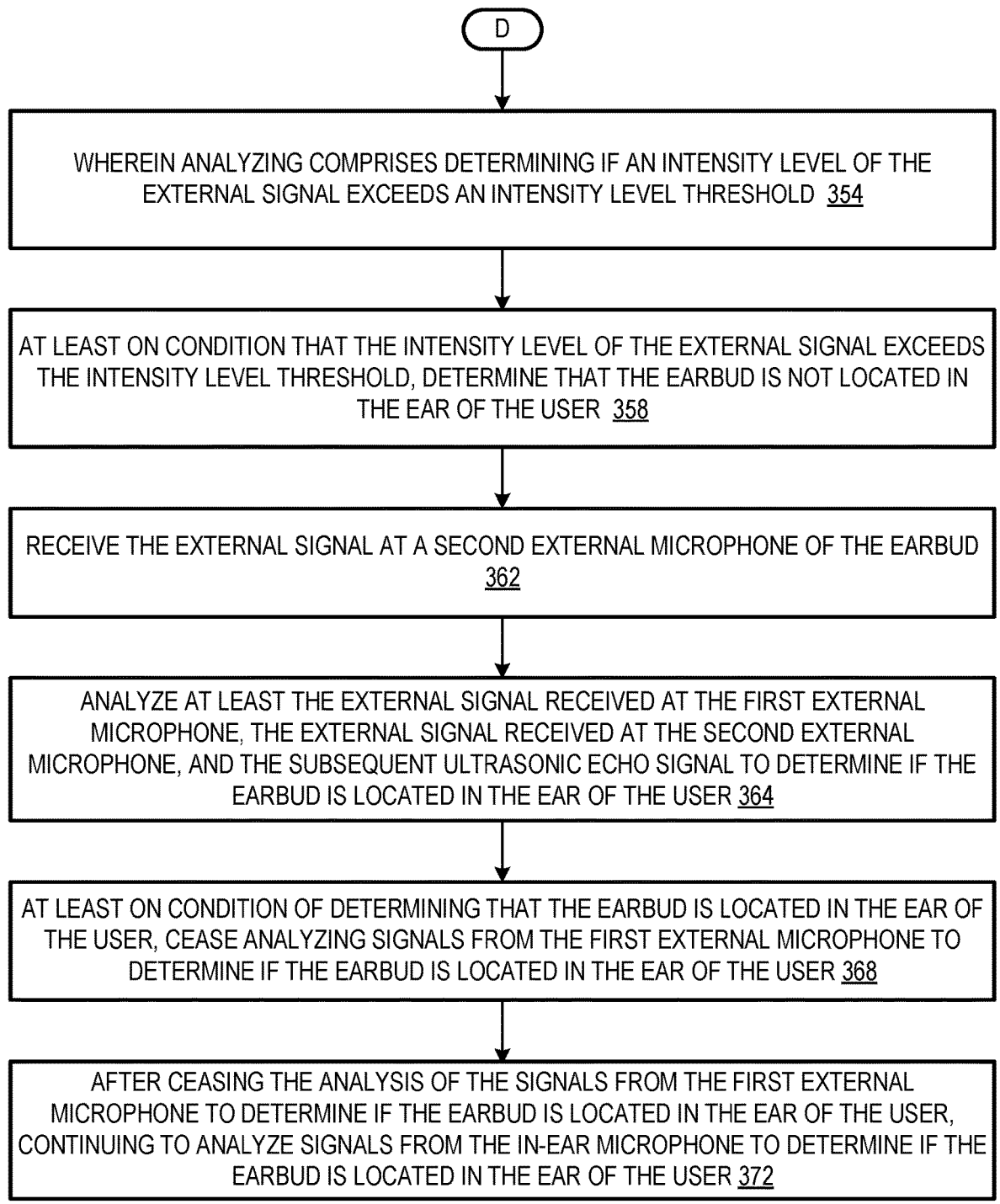

With reference now to FIG. 3D, in some examples and as described further below, at 354 the method 300 includes, wherein analyzing at least the external signal and the subsequent ultrasonic echo signal to determine if the earbud is located in the ear of the user comprises determining if an intensity level of the external signal exceeds an intensity level threshold. At 358 the method 300 includes, at least on condition that the intensity level of the external signal exceeds the energy level threshold, determining that the earbud is not located in the ear of the user.

In these examples, an intensity level of an external signal received at an external microphone of the earbud 200 can be analyzed to determine that the earbud is not located in the ear of the user. For example and with reference again to FIG. 10, in this example of the signal received by the first external microphone 204B when the earbud 200 is located inside a closed hand of the user, between approximately 0.38 secs and 0.5 secs the positive intensity of the signal varies between approximately 40 and 120. By contrast and as shown in FIG. 8, when the earbud 200 is located inside the user's ear the positive intensity of the signal received by the first external microphone 204B between approximately 0.38 secs and 0.5 secs is considerably lower and fairly constant.

Accordingly, a predetermined threshold intensity level can be established that corresponds to a high likelihood that the earbud 200 is not located in the user's ear. In the present example, a threshold intensity level of 100 between approximately 0.38 and 0.5 secs can be utilized to indicate that the earbud 200 is not located in the user's ear. Accordingly, when an initial ultrasonic signal is broadcast from the earbud speaker 202 and the first external microphone 204B receives a signal having an intensity level above 100 between approximately 0.38 and 0.5 secs (for example as shown in FIG. 10), the earbud 200 can determine that it is not located in the user's ear. Advantageously, in these examples the earbud 200 can utilize a simple threshold determination to quickly determine that the earbud 200 is not located in an ear of the user.

As noted above, in some examples external signals corresponding to ultrasonic signals broadcast by the earbud speaker 202 are received at both the first external microphone 204B and the second external microphone 204C and analyzed by the in-ear determination algorithms 214 along with ultrasonic signals received by the in-ear microphone to determine if the earbud 200 is located in the user's ear. In these examples and with reference again to FIG. 3D, at 362 the method 300 includes receiving the external signal at a second external microphone of the earbud. And at 364 the method 300 includes analyzing at least the external signal received at the first external microphone and at the second external microphone, and the subsequent ultrasonic echo signal received at the in-ear microphone to determine if the earbud is located in an ear of the user.

In some examples and as noted above, classifiers for the in-ear microphone 204A and the two external microphones 204B and 204C can analyze the respective signals received by these microphones and output probabilities that the earbud 200 is or is not located in an ear of the user. These probabilities can be aggregated and compared to a threshold to determine whether the earbud is located in the ear of the user. In these examples and in another potential advantage of the present disclosure, utilizing both the first and second external microphones 204B, 204C along with the in-ear microphone 204A to analyze signals received at the microphones from the earbud speaker 202 can provide a more robust estimation of the likelihood that the earbud 200 is located in an ear of the user.

In some examples, and to advantageously conserve power resources and battery life, when the earbud 200 determines that it is located in the ear of the user, the earbud can cease analyzing signals from the first external microphone 204B and/or second external microphone 204C, and utilize just signals from the in-ear microphone 204A to continue monitoring whether the earbud remains in the user's ear. Accordingly, and with reference again to FIG. 3D, at 368 the method 300 includes, at least on condition of determining that the earbud is located in the ear of the user, analyzing signals from the first external microphone to determine if the earbud is located in the ear of the user. And at 372 the method 300 includes, after ceasing the analysis of the signals from the first external microphone to determine if the earbud is located in the ear of the user, continuing to analyze signals from the in-ear microphone to determine if the least one earbud is located in the ear of the user.

Figure 12:
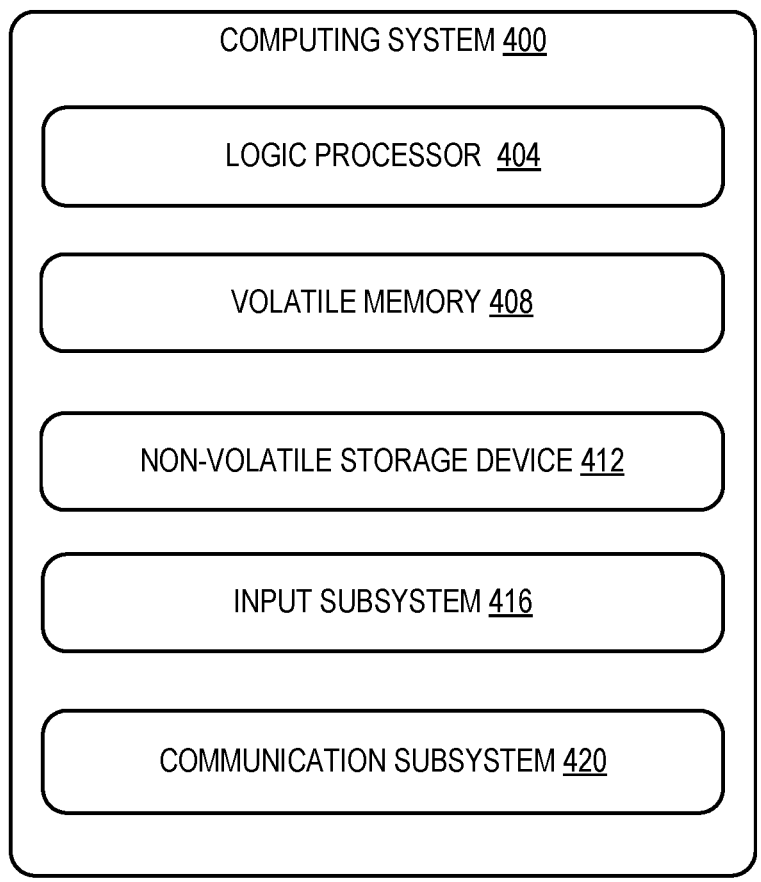
FIG. 12 shows a block diagram of an example computing system according to examples of the present disclosure.

FIG. 12 schematically shows a simplified representation of a computing system 400 configured to provide any to all of the compute functionality described herein. Computing system 400 is shown in simplified form. The earbud 100 and earbud 200 described above may comprise computing system 400 or one or more aspects of computing system 400.

Computing system 400 includes a logic processor 404, volatile memory 408, and a non-volatile storage device 412. Computing system 400 may optionally include an input subsystem 416, communication subsystem 420, and/or other components not shown in FIG. 12. Logic processor 404 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 404 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 404 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 408 may include physical devices that include random access memory. Volatile memory 408 is typically utilized by logic processor 404 to temporarily store information during processing of software instructions. It will be appreciated that volatile memory 408 typically does not continue to store instructions when power is cut to the volatile memory 408.

Non-volatile storage device 412 includes one or more physical devices configured to hold instructions executable by the logic processors to implement the methods and processes described herein. When such methods and processes are implemented, the state of non-volatile storage device 412 may be transformed—e.g., to hold different data.

Non-volatile storage device 412 may include physical devices that are removable and/or built-in. Non-volatile storage device 412 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 412 may include nonvolatile, dynamic, static, read/write, read-only, sequential-access, location-addressable, file-addressable, and/or content-addressable devices. It will be appreciated that non-volatile storage device 412 is configured to hold instructions even when power is cut to the non-volatile storage device 412.

Aspects of logic processor 404, volatile memory 408, and non-volatile storage device 412 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), microcontroller units (MCUs), and complex programmable logic devices (CPLDs), for example.

When included, input subsystem 416 may comprise or interface with one or more user-input devices such as a touch-sensitive surface on the earbud, stylus, touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 420 may be configured to communicatively couple the computing system 400 with other computing systems and devices. Communication subsystem 420 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a method of using an earbud to establish a user's second authenticated session in a second computing device, the method comprising: after establishing a user's first authenticated session in a first computing device, broadcasting an initial ultrasonic signal from a speaker of the earbud; analyzing at least a subsequent ultrasonic echo signal received at an in-ear microphone of the earbud to determine if the earbud is located in an ear of the user; determining that the earbud is within a predetermined distance of the second computing device; and at least on condition of determining that the earbud is located in the ear of the user and that the earbud is within the predetermined distance of the second computing device, establishing the user's second authenticated session in the second computing device. The method may additionally or alternatively include, wherein the subsequent ultrasonic echo signal is a first subsequent ultrasonic echo signal, the method further comprising: after analyzing the first subsequent ultrasonic echo signal, analyzing a second subsequent ultrasonic echo signal received at the in-ear microphone of the earbud to determine if the earbud is still located in an ear of the user; and at least on condition of determining that the earbud is not located in the ear of the user, refraining from establishing a user's third authenticated session in a third computing device. The method may additionally or alternatively include, wherein refraining from establishing the user's third authenticated session in the third computing device comprises: during an interim period after determining that the earbud is not located in the ear of the user, continuing to broadcast additional ultrasonic signals from the speaker of the earbud; analyzing additional subsequent ultrasonic echo signals received at the in-ear microphone to determine if the earbud is located in the ear of the user; and at least on condition of the interim period expiring and determining that the earbud is not located in the ear of the user, refraining from establishing the user's third authenticated session in the third computing device. The method may additionally or alternatively include, after determining that the earbud is not located in the ear of the user: continuing to broadcast additional ultrasonic signals from the speaker of the earbud; determining that the earbud is stationary; and at least on condition of determining that the earbud is stationary, ceasing broadcasting ultrasonic signals from the speaker of the earbud. The method may additionally or alternatively include, prior to broadcasting the initial ultrasonic signal, receiving a movement signal from a movement sensor of the earbud; and at least on condition of receiving the movement signal, broadcasting the initial ultrasonic signal from the speaker of the earbud. The method may additionally or alternatively include, determining if the movement signal corresponds to at least one erroneous movement case; and at least on condition of determining that the movement signal corresponds to the at least one erroneous movement case, refraining from broadcasting the initial ultrasonic signal from the speaker of the earbud. The method may additionally or alternatively include, receiving an external signal at a first external microphone of the earbud; and analyzing at least the external signal and the subsequent ultrasonic echo signal to determine if the earbud is located in the ear of the user. The method may additionally or alternatively include, wherein analyzing at least the external signal and the subsequent ultrasonic echo signal to determine if the earbud is located in the ear of the user comprises determining if an intensity level of the external signal exceeds an intensity level threshold, and the method further comprising, at least on condition that the intensity level of the external signal exceeds the intensity level threshold, determining that the earbud is not located in the ear of the user. The method may additionally or alternatively include, receiving the external signal at a second external microphone of the earbud; and analyzing at least the external signal received at the first external microphone, the external signal received at the second external microphone, and the subsequent ultrasonic echo signal to determine if the earbud is located in an ear of the user. The method may additionally or alternatively include, at least on condition of determining that the earbud is located in the ear of the user, cease analyzing signals from the first external microphone to determine if the earbud is located in the ear of the user. The method may additionally or alternatively include, after ceasing the analysis of the signals from the first external microphone to determine if the earbud is located in the ear of the user, continuing to analyze signals from the in-ear microphone to determine if the earbud is located in the ear of the user.

Another aspect provides an earbud, comprising: a speaker; an in-ear microphone; a processor; and a memory storing instructions executable by the processor to: broadcast an initial ultrasonic signal from the speaker after establishing a user's first authenticated session in a first computing device; analyze at least a subsequent ultrasonic echo signal received at the in-ear microphone to determine if the earbud is located in an ear of a user; determine that the earbud is within a predetermined distance of a second computing device; and at least on condition of determining that the earbud is located in the ear of the user and that the earbud is within the predetermined distance of the second computing device, establish a user's second authenticated session in the second computing device. The earbud may additionally or alternatively include, wherein the subsequent ultrasonic echo signal is a first subsequent ultrasonic echo signal, and the instructions are executable to: after analyzing the first subsequent ultrasonic echo signal, analyze a second subsequent ultrasonic echo signal received at the in-ear microphone of the earbud to determine if the earbud is still located in an ear of the user; and at least on condition of determining that the earbud is not located in the ear of the user, refrain from establishing a users' third authenticated session in a third computing device. The earbud may additionally or alternatively include, wherein refraining from establishing the user's third authenticated session in the third computing device comprises: during an interim period after determining that the earbud is not located in the ear of the user, continuing to broadcast additional ultrasonic signals from the speaker of the earbud; analyzing additional subsequent ultrasonic echo signals received at the in-ear microphone to determine if the earbud is located in the ear of the user; and at least on condition of the interim period expiring and determining that the earbud is not located in the ear of the user, refrain from establishing the user's third authenticated session in the third computing device. The earbud may additionally or alternatively include, wherein the instructions are executable to, after determining that the earbud is not located in the ear of the user: continue to broadcast additional ultrasonic signals from the speaker of the earbud; determine if the earbud is stationary; and at least on condition of determining that the earbud is stationary, cease broadcasting ultrasonic signals from the speaker of the earbud. The earbud may additionally or alternatively include, wherein the instructions are executable to: prior to broadcasting the initial ultrasonic signal, receive a movement signal from a movement sensor of the earbud; and at least on condition of receiving the movement signal, broadcast the initial ultrasonic signal from the speaker of the earbud. The earbud may additionally or alternatively include, wherein the instructions are executable to: determine if the movement signal corresponds to at least one erroneous movement case; and at least on condition of determining that the movement signal corresponds to the at least one erroneous movement case, refraining from broadcasting the initial ultrasonic signal from the speaker of the earbud. The earbud may additionally or alternatively include, wherein the instructions are executable to: receive an external signal at a first external microphone of the earbud; and analyze at least the external signal and the subsequent ultrasonic echo signal to determine if the earbud is located in the ear of the user. The earbud may additionally or alternatively include, wherein analyzing at least the external signal and the subsequent ultrasonic echo signal to determine if the earbud is located in the ear of the user comprises determining if an intensity level of the external signal exceeds an intensity level threshold, and the method further comprising, at least on condition that the intensity level of the external signal exceeds the intensity level threshold, determining that the earbud is not located in the ear of the user.

Another aspect provides An earbud comprising: a speaker; a plurality of microphones comprising an in-ear microphone and an external microphone; a processor; and a memory storing instructions executable by the processor to: after establishing a user's first authenticated session in a first computing device, broadcast an initial ultrasonic signal from the speaker; receive a first subsequent ultrasonic echo signal at the in-ear microphone; receive a first external signal at the external microphone; analyze at least the first subsequent ultrasonic echo signal received at the in-ear microphone and the first external signal received at the external microphone to determine if the earbud is located in the ear of the user; determine that the earbud is within a predetermined distance of a second computing device; at least on condition of determining that the earbud is located in the ear of the user and that the earbud is within the predetermined distance of the second computing device, establish a user's second authenticated session in the second computing device; after analyzing the first subsequent ultrasonic echo signal and the first external signal, analyze a second subsequent ultrasonic echo signal received at the in-ear microphone of the earbud and a second external signal received at the external microphone to determine if the earbud is still located in an ear of the user; and at least on condition of determining that the earbud is not located in the ear of the user, refrain from establishing a user's third authenticated session in a third computing device.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of using an earbud to establish a user's second authenticated session in a second computing device, the method comprising:
    after establishing a user's first authenticated session in a first computing device, broadcasting an initial ultrasonic signal from a speaker of the earbud;
    analyzing at least a subsequent ultrasonic echo signal received at an in-ear microphone of the earbud to determine if the earbud is located in an ear of the user;
    determining that the earbud is within a predetermined distance of the second computing device; and
    at least on condition of determining that the earbud is located in the ear of the user and that the earbud is within the predetermined distance of the second computing device, establishing the user's second authenticated session in the second computing device.

2. The method of claim 1, wherein the subsequent ultrasonic echo signal is a first subsequent ultrasonic echo signal, the method further comprising:
    after analyzing the first subsequent ultrasonic echo signal, analyzing a second subsequent ultrasonic echo signal received at the in-ear microphone of the earbud to determine if the earbud is still located in an ear of the user; and
    at least on condition of determining that the earbud is not located in the ear of the user, refraining from establishing a user's third authenticated session in a third computing device.

3. The method of claim 2, wherein refraining from establishing the user's third authenticated session in the third computing device comprises:
    during an interim period after determining that the earbud is not located in the ear of the user, continuing to broadcast additional ultrasonic signals from the speaker of the earbud;
    analyzing additional subsequent ultrasonic echo signals received at the in-ear microphone to determine if the earbud is located in the ear of the user; and at least on condition of the interim period expiring and determining that the earbud is not located in the ear of the user, refraining from establishing the user's third authenticated session in the third computing device.

4. The method of claim 2, further comprising, after determining that the earbud is not located in the ear of the user:
continuing to broadcast additional ultrasonic signals from the speaker of the earbud;
determining that the earbud is stationary; and
at least on condition of determining that the earbud is stationary, ceasing broadcasting ultrasonic signals from the speaker of the earbud.

5. The method of claim 1, further comprising:
prior to broadcasting the initial ultrasonic signal, receiving a movement signal from a movement sensor of the earbud; and
at least on condition of receiving the movement signal, broadcasting the initial ultrasonic signal from the speaker of the earbud.

6. The method of claim 5, further comprising:
determining if the movement signal corresponds to at least one erroneous movement case; and
at least on condition of determining that the movement signal corresponds to the at least one erroneous movement case, refraining from broadcasting the initial ultrasonic signal from the speaker of the earbud.

7. The method of claim 1, further comprising:
receiving an external signal at a first external microphone of the earbud; and
analyzing at least the external signal and the subsequent ultrasonic echo signal to determine if the earbud is located in the ear of the user.

8. The method of claim 7, wherein analyzing at least the external signal and the subsequent ultrasonic echo signal to determine if the earbud is located in the ear of the user comprises determining if an intensity level of the external signal exceeds an intensity level threshold, and the method further comprising, at least on condition that the intensity level of the external signal exceeds the intensity level threshold, determining that the earbud is not located in the ear of the user.

9. The method of claim 7, further comprising:
receiving the external signal at a second external microphone of the earbud; and
analyzing at least the external signal received at the first external microphone, the external signal received at the second external microphone, and the subsequent ultrasonic echo signal to determine if the earbud is located in an ear of the user.

10. The method of claim 7, further comprising, at least on condition of determining that the earbud is located in the ear of the user, cease analyzing signals from the first external microphone to determine if the earbud is located in the ear of the user.

11. The method of claim 10, further comprising, after ceasing the analysis of the signals from the first external microphone to determine if the earbud is located in the ear of the user, continuing to analyze signals from the in-ear microphone to determine if the earbud is located in the ear of the user.

12. An earbud, comprising:
a speaker;
an in-ear microphone;
a processor; and
a memory storing instructions executable by the processor to:
broadcast an initial ultrasonic signal from the speaker after establishing a user's first authenticated session in a first computing device;
analyze at least a subsequent ultrasonic echo signal received at the in-ear microphone to determine if the earbud is located in an ear of a user;
determine that the earbud is within a predetermined distance of a second computing device; and
at least on condition of determining that the earbud is located in the ear of the user and that the earbud is within the predetermined distance of the second computing device, establish a user's second authenticated session in the second computing device.

13. The earbud of claim 12, wherein the subsequent ultrasonic echo signal is a first subsequent ultrasonic echo signal, and the instructions are executable to:
after analyzing the first subsequent ultrasonic echo signal, analyze a second subsequent ultrasonic echo signal received at the in-ear microphone of the earbud to determine if the earbud is still located in an ear of the user; and
at least on condition of determining that the earbud is not located in the ear of the user, refrain from establishing a users' third authenticated session in a third computing device.

14. The earbud of claim 13, wherein refraining from establishing the user's third authenticated session in the third computing device comprises:
during an interim period after determining that the earbud is not located in the ear of the user, continuing to broadcast additional ultrasonic signals from the speaker of the earbud;
analyzing additional subsequent ultrasonic echo signals received at the in-ear microphone to determine if the earbud is located in the ear of the user; and
at least on condition of the interim period expiring and determining that the earbud is not located in the ear of the user, refrain from establishing the user's third authenticated session in the third computing device.

15. The earbud of claim 14, wherein the instructions are executable to, after determining that the earbud is not located in the ear of the user:
continue to broadcast additional ultrasonic signals from the speaker of the earbud;
determine if the earbud is stationary; and
at least on condition of determining that the earbud is stationary, cease broadcasting ultrasonic signals from the speaker of the earbud.

16. The earbud of claim 12, wherein the instructions are executable to:
prior to broadcasting the initial ultrasonic signal, receive a movement signal from a movement sensor of the earbud; and
at least on condition of receiving the movement signal, broadcast the initial ultrasonic signal from the speaker of the earbud.

17. The earbud of claim 16, wherein the instructions are executable to:
determine if the movement signal corresponds to at least one erroneous movement case; and
at least on condition of determining that the movement signal corresponds to the at least one erroneous movement case, refraining from broadcasting the initial ultrasonic signal from the speaker of the earbud.

18. The earbud of claim 12, wherein the instructions are executable to:
    receive an external signal at a first external microphone of the earbud; and
    analyze at least the external signal and the subsequent ultrasonic echo signal to determine if the earbud is located in the ear of the user.

19. The earbud of claim 18, wherein analyzing at least the external signal and the subsequent ultrasonic echo signal to determine if the earbud is located in the ear of the user comprises determining if an intensity level of the external signal exceeds an intensity level threshold, and the method further comprising, at least on condition that the intensity level of the external signal exceeds the intensity level threshold, determining that the earbud is not located in the ear of the user.

20. An earbud comprising:
    a speaker;
    a plurality of microphones comprising an in-ear microphone and an external microphone;
    a processor; and
    a memory storing instructions executable by the processor to:
        after establishing a user's first authenticated session in a first computing device, broadcast an initial ultrasonic signal from the speaker;
        receive a first subsequent ultrasonic echo signal at the in-ear microphone;
        receive a first external signal at the external microphone;
        analyze at least the first subsequent ultrasonic echo signal received at the in-ear microphone and the first external signal received at the external microphone to determine if the earbud is located in the ear of the user;
        determine that the earbud is within a predetermined distance of a second computing device;
        at least on condition of determining that the earbud is located in the ear of the user and that the earbud is within the predetermined distance of the second computing device, establish a user's second authenticated session in the second computing device;
        after analyzing the first subsequent ultrasonic echo signal and the first external signal, analyze a second subsequent ultrasonic echo signal received at the in-ear microphone of the earbud and a second external signal received at the external microphone to determine if the earbud is still located in an ear of the user; and
        at least on condition of determining that the earbud is not located in the ear of the user, refrain from establishing a user's third authenticated session in a third computing device.

* * * * *